United States Patent [19]

Ladin

[11] 4,355,992
[45] Oct. 26, 1982

[54] ROTATABLE MACHINE ASSEMBLY

[75] Inventor: Eli M. Ladin, Ann Arbor, Mich.

[73] Assignee: Federal-Mogul Corporation, Detroit, Mich.

[21] Appl. No.: 106,592

[22] Filed: Dec. 26, 1979

[51] Int. Cl.³ ............................................. F16H 7/06
[52] U.S. Cl. ..................................... 474/152; 277/95; 308/187.1
[58] Field of Search ............ 474/152, 161, 165, 199; 308/181, 187.1, 191; 277/82, 91, 92, 152, 95

[56] References Cited

U.S. PATENT DOCUMENTS

| | | | |
|---|---|---|---|
| 2,144,691 | 1/1939 | Schmal | 277/95 |
| 2,320,794 | 6/1943 | Pew | 277/95 |
| 2,712,966 | 7/1955 | Brady et al. | 308/181 |
| 2,823,553 | 2/1958 | Harrington | 474/165 X |
| 2,860,896 | 11/1958 | Naumann | 277/152 X |
| 2,979,345 | 4/1961 | Potter | 277/152 X |
| 3,022,081 | 2/1962 | Kosatka | 277/82 X |
| 3,169,809 | 2/1965 | Pendleton | 277/82 X |
| 3,306,223 | 2/1967 | Liebig | 277/82 X |
| 3,499,654 | 3/1970 | Lower | 277/95 |
| 3,797,899 | 3/1974 | Anderson | 308/187.1 |
| 3,835,933 | 9/1974 | Coski | 308/187.1 X |
| 3,923,351 | 12/1975 | Frost | 308/187.1 |
| 3,932,006 | 1/1976 | Tertinek et al. | 308/187.1 X |

*Primary Examiner*—Rodney H. Bonck

*Attorney, Agent, or Firm*—Robert F. Hess; William G. Coon

[57] ABSTRACT

A rotatable machine assembly comprising a sprocket with a casing defined by a pair of plates secured together and supported on a hub through a ball bearing assembly. The ball bearings are supported between an outer race member and a raceway in the hub. The plates of the casing surround and are supported by the outer race member so as to define annular axially spaced side walls on each side of the ball bearing assembly. A seal is supported by the hub on each side of the ball bearing with each seal being disposed entirely axially inwardly of the exterior surface of the respective side walls and in sealing engagement with the interior surface of each of the side walls thereby sealing the ball bearing while being protected by the side walls. Each seal includes a metal backing plate to which is bonded an integral elastomeric seal member having a plurality of lips engaging the interior surface of the adjacent side wall and an annular pad in sealing engagement with the interior edge of the circular opening in the adjacent side wall. The lips slant toward the axis of the hub and the pad portion includes a similarly slanted sealing surface engaging the interior edge of the opening in the adjacent side wall. Secondary seals are supported by the outer race member for sealing engagement with the hub means.

11 Claims, 4 Drawing Figures

ROTATABLE MACHINE ASSEMBLY

BACKGROUND OF THE INVENTION

(1) Field of the Invention

The subject invention relates to a rotatable machine assembly such as a pulley, a sprocket, or the like; however, the invention was developed primarily as a rotatable sprocket for use in farming implements. One example of the many uses of sprockets in farm implements is the use of a rotatable sprocket in a corn picker to support a chain in the forward portion of the corn picker near the ground whereby the stalks of corn are engaged by members extending from the chain to guide the corn stalks into the picking apparatus. As will be appreciated, such sprockets need to be extremely rugged as they are exposed to moisture, mud, dust, dirt, rocks and other foreign objects such as wire.

(2) Description of the Prior Art

Rotatable machine assemblies of the type to which the instant invention pertains have typically included a casing made from two plates secured together, as by rivets, with the outer circular periphery of the plates defining a pulley groove, sprocket teeth, or the like. The casing is usually rotatably supported on a hub by a bearing assembly. The assemblies include seals between the casing and the hub to protect the bearings from the very detrimental abrasive and abusive elements of the farm field environment. A major problem in the prior art assemblies has been the protection of the seals from the raw elements of the farm field environment. For example, it is not uncommon for a piece of wire to be wound up or tangled up in the sprocket assembly and engage and destroy the bearing seals.

SUMMARY OF THE INVENTION

In accordance with the subject invention, there is provided a rotatable machine assembly including an improved sealing means which are protected from the raw elements of an abusive environment. The assembly includes hub means having an axis and casing means extending radially of the axis of the hub means to a circular periphery. Bearing means interconnect the hub means and the casing means for allowing relative rotation between the casing means and the hub means about the axis thereof. The casing means includes annular axially spaced side walls with one of the walls on one side of the bearing means and the other on the other side of the bearing means with each side wall having a circular opening surrounding and in close spaced relationship to the hub means. A pair of annular seal means are supported by the hub means on opposite sides of the bearing means with each seal means being disposed entirely axially inwardly of the exterior surface of the adjacent side wall and in sealing engagement with the interior surface of the adjacent side wall thereby sealing the bearing means while being protected by the side walls of the casing.

PRIOR ART STATEMENT

Typical of the prior art is the assembly shown in U.S. Pat. No. 2,712,966 to J. W. Brady et al, granted July 12, 1955. The assembly disclosed in that patent is a coulter which is subjected to the same farm field environment as the subject invention. In the assembly of Brady et al. there is a seal disposed between the circular opening of the casing and the hub and, in addition, there is a shield supported exteriorly thereof with a gasket disposed between the shield and the outer surface of the casing. It is possible in the Brady et al. assembly that a wire could become tangled up in the assembly to destroy the gasket between the shield and the casing and to further destroy the seal between the casing and the hub.

In the improved assembly of the subject invention the side walls of the casing surround and protect the seals.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

A rotatable machine assembly taking the form of a sprocket assembly is generally shown at 10.

Figure 1:
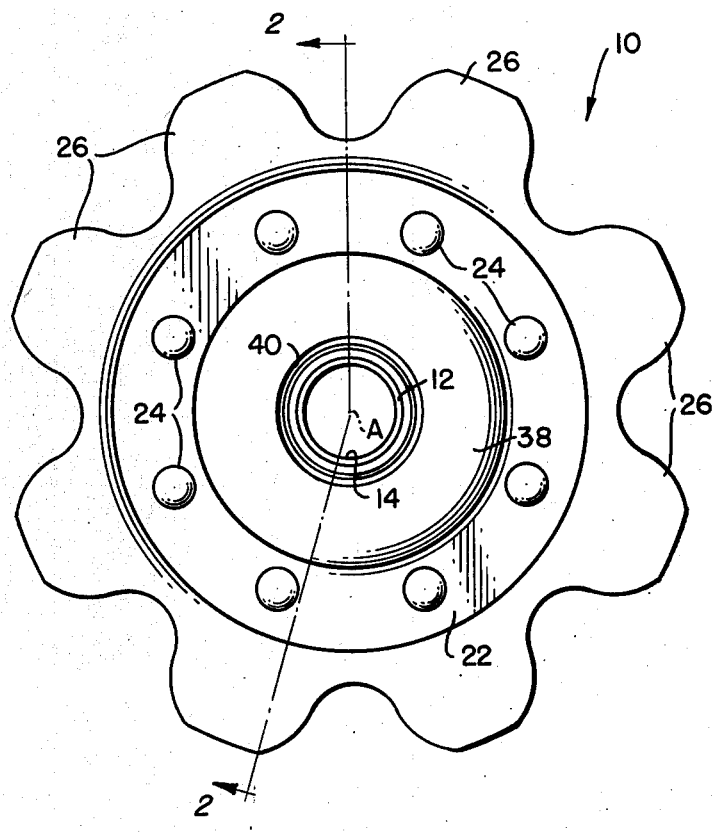
FIG. 1 is a side-elevational view of a preferred embodiment of the subject invention.
Figure 2:
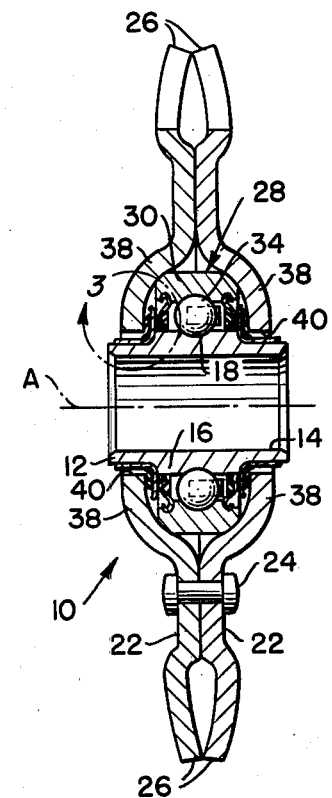
FIG. 2 is a cross-sectional view taken substantially along line 2—2 of FIG. 1.
Figure 3:
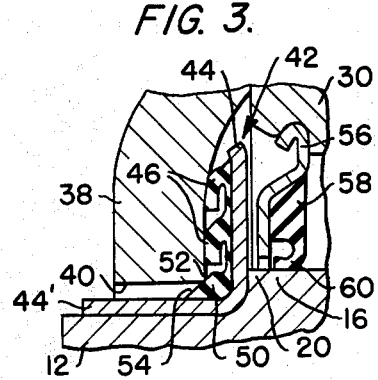
FIG. 3 is an enlarged fragmentary cross-sectional view taken within the circle marked "3" of FIG. 2.
Figure 4:
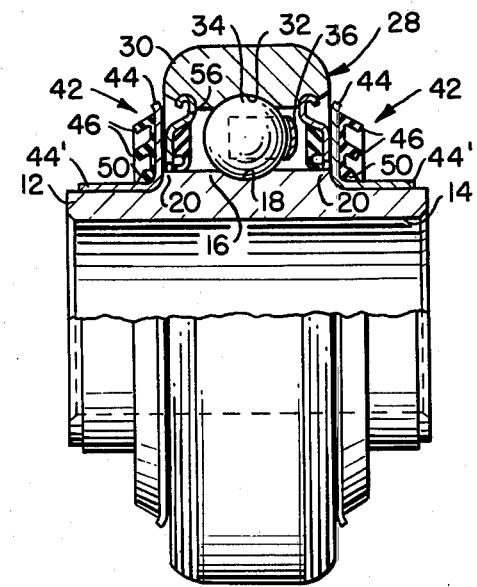
FIG. 4 is an enlarged view of the hub and seal assembly without the casing attached thereto.

The sprocket assembly 10 includes a hub means comprising an integral metal hub 12 having an axis of rotation A. The hub 12 is made of metal by casting, forging, or the like, and includes a central bore 14 for receiving a shaft, spindle, or the like. The bore 14 is finished and includes chamfered ends. The hub includes a central annularly extending raised portion 16 in which is finished an inner annular raceway 18. The axially opposite extremities of the raised portion 16 define shoulders 20 as best illustrated in FIGS. 3 and 4.

The assembly 10 also includes a casing means comprising a pair of plates 22 fastened together by rivets 24. The casing means defined by the plates 22 extends radially of the axis A of the hub 12 to an outer circular periphery. The outer circular periphery of the casing means defined by the plates 22 includes mechanical drive means for the transmission of mechanical motion in the form of a plurality of sprocket teeth 26 disposed about the circular periphery.

The assembly 10 also includes bearing means generally indicated at 28 interconnecting the hub 12 and the plates 22 of the casing means for allowing relative rotation between the casing means and the hub 12 about the axis A. Usually the hub 12 would be fixed to a support shaft and the sprocket member defined by the plates 22 of the casing means would rotate relative to the hub 12. The bearing means 28 includes an outer race member 30 which extends annularly about the hub 12 and defines an outer raceway 32 as shown in FIG. 4. The bearing means 28 also includes a plurality of bearing balls 34 disposed in the raceways 18 and 32. A bearing cage 36 separates the adjacent balls 34 from one another. The plates 22 are secured together in a manner to clamp the outer race member 30 between the plates 22 so that the plates 22 are supported upon the outer race member 30.

The casing means comprising the plates 22 includes annular axially spaced side walls 38 with one of the side walls 38 on one side of the bearing means 28 and the other of the side walls 38 on the other side of the bearing means 28. In other words, as the plates 22 are viewed in cross section they are disposed in spaced-apart relationship at their outer periphery defining the sprocket teeth 26 and then are in mating engagement where they are secured or fastened together by the rivets 24 and then split into a Y to form an annular chamber surrounding the bearing means 28.

The side walls 38 each have a circular opening 40 surrounding and in close proximal spaced relationship to the hub 12. A pair of annular seal means, as generally shown at 42 in FIGS. 3 and 4, are supported by the hub 12 on opposite sides of the bearing means 28. Each of the seal means 42 are disposed entirely axially inwardly of the exterior surface of the adjacent side wall 38 and in sealing engagement with the interior surface of each adjacent side wall 38 thereby sealing the bearing means 28 while being protected from the outside environment by the side walls 38.

There is included an annular support portion 44 extending radially of the axis A from the hub 12 and spaced axially inwardly from the interior surface of the adjacent side wall 38. Each seal means 42 includes a plurality of annular lips or ribs 46 (in this case two) extending from the support portion 44 and engaging the interior surface of the adjacent side wall 38. The lips 46, as best illustrated in FIG. 4 where the lips are shown before the plates 22 of the casing means are attached to the outer race member 30, slant at an acute angle from the support portion 44 inwardly toward the axis A of the hub means. In the free state, as shown in FIG. 4, the lips 46 slant downwardly and outwardly from the central plane disposed centrally of the casing means or between the plates 22. When assembled, as illustrated in FIG. 3, the lips 46 still slant downwardly at that acute angle but the ends thereof are buckled over and in sliding or wiping engagement with the interior surface of the walls 38 as best illustrated in FIG. 3. It will be noted that as illustrated in FIG. 4 the lips 46 are generally parallel to one another.

Each of the seal means 42 also includes an annular pad portion 50 in sealing engagement with the interior edge 52, as illustrated in FIG. 3, of the circular opening 40 in the adjacent side wall 38. Each pad portion 50, as illustrated in FIG. 3, includes a sealing surface 54 which slants at an acute angle to the axis A of the hub 12 with the interior edge 52 of the adjacent opening 40 digging into or embedding into the sealing surface 54.

The lips 46 and pad portion 50 of each seal means 42 are defined by an integral single member made of elastomeric material. The support portion 44 associated with each seal means is defined by a metal backing plate with the elastomeric material bonded thereto. More specifically, each backing plate 44 includes an annular radially extending portion supporting the lips 46 and an annular axially extending portion 44' surrounding and secured to the hub 12. The annular extending portion 44' is secured to the hub 12 by being press-fitted thereon in a manner that the radially extending portion of the member 44 abuts the shoulder 20 in the hub 12. The pad portion 50 of the seal means is disposed in the corner defined by the radially and axially extending portions and is, therefore, supported by both portions of the backing plate, i.e., the backing plate is L-shaped in cross section as best shown in FIG. 3.

The assembly also includes secondary seals each of which includes a metal backing disc 56 and elastomeric sealing material 58 having an annular lip 60. Each secondary seal is supported by the outer race member 30 on either side of the balls 34 by being snapped into an annular groove on the inside of the outer race member 30. The elastomeric material 58 is bonded to the metal backing disc 56 and the lip 60 thereof is in sliding sealing engagement with the raised portion 20 of the hub 12. The metal backing disc 56 extends to a circular opening which surrounds the raised portion 20 of the hub 12 and is in close proximity thereto.

As alluded to above, when the bearing means 28 is disposed upon the hub 12 and the seal means 42 are positioned on the hub 12, as illustrated in FIG. 4, the plates 22 of the casing means are then disposed thereabout. As illustrated in FIG. 3, the seal means 42 are protected by the side walls 38 of the plates 22 as the pad portions 50 of the seal means 42 are disposed axially inwardly from the outer or exterior surfaces of the side walls 38 whereby the side walls 38 protect the seal means 42 from elements of a raw environment, particularly, because of the close spacing of the opening 40 in the side walls 38 to the hub 12 and/or the axially extending annular wall 44'.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A rotatable machine assembly comprising; hub means having an axis, casing means extending radially of said axis of said hub means to a circular periphery, bearing means interconnecting said hub means and said casing means for allowing relative rotation between said casing means and said hub means about said axis, said casing means including annular axially spaced side walls with one of said side walls on one side of said bearing means, and the other of said side walls on the other side of said bearing means, said side walls each having a circular opening surrounding and in close spaced relationship to said hub means, a pair of annual seal means non-rotatably supported by said hub means on opposite sides of said bearing means, and annular support portion extending radially of said axis from said hub means and spaced axially inwardly from said interior surface of the adjacent side wall, said seal means including at least one annular lip extending at an acute angle from said support portion toward the axis of said hub means, said lip being deflected radially inwardly by and in sliding engagement with said interior surface of said adjacent side wall, and said seal means including an annular pad portion in sealing engagement with the interior edge of said circular opening in the adjacent sidewall.

2. An assembly as set forth in claim 1 wherein each pad portion includes a sealing surface which slants at an acute angle to said axis of said hub means with said interior edge of the adjacent opening digging into said sealing surface.

3. An assembly as set forth in claim 2 wherein each of said seal means includes a plurality of said lips.

4. An assembly as set forth in claim 3 wherein said lips and pad portion of each seal means are defined by an integral single member made of an elastomeric material, and each support portion is defined by a metal backing plate with said elastomeric material bonded thereto.

5. An assembly as set forth in claim 4 wherein each of said backing plates includes an annular radially extending portion supporting said lips and an annular axially extending portion surrounding and secured to said hub means with said pad portion supported by both of said portions of said backing plate.

6. An assembly as set forth in claim 5 wherein said circular periphery of said casing means includes mechanical drive means for the transmission of mechanical motion.

7. An assembly as set forth in claim 6 wherein said mechanical drive means comprises a plurality of sprocket teeth about said circular periphery.

8. An assembly as set forth in claim 6 wherein said hub means includes an annular inner raceway and said bearing means includes an outer race member defining an outer raceway and a plurality of bearing balls disposed in said raceways.

9. An assembly as set forth in claim 8 wherein said casing means comprises a pair of plates secured together and supported upon said outer race member.

10. A sealing assembly comprising; hub means having an axis, outer race member being spaced radially from said hub means, bearing means interconnecting said hub means and said outer race member for allowing relative rotation between said outer race member and said hub means about said axis, a pair of annular axially spaced side walls extending radially inward from said outer race member with one of said side walls being disposed on one side of said bearing means and the other of said side walls being disposed on the other side of said bearing means, said side walls each having a circular opening surrounding and in close spaced relationship to said hub means, a pair of annular seal means non-rotatably supported by said hub means on opposite sides of said bearing means, said annular seal means each including an annular support portion extending radially of said axis from said hub means and spaced axially inwardly from said interior surface of the adjacent side wall, said seal means including at least one annular lip extending at an acute angle from said support portion inwardly toward said axis of said hub means and engaging said sidewall, said lip being deflected radially inwardly by and in sliding engagement with said sidewall, and including secondary seals supported by said outer race member on either side of said bearing means and in sealing engagement with said hub means interiorly of said seal means.

11. An assembly as set forth in claim 10 wherein each of said secondary seals includes a metal backing disc fixed to said outer race member and elastomeric sealing material bonded thereto and extending from said backing disc to sealingly engage said hub means.

* * * * *